(12) United States Patent
Boies

(10) Patent No.: US 10,405,471 B2
(45) Date of Patent: Sep. 10, 2019

(54) TOOL HANDLE AND METHOD OF FABRICATION THEREOF

(71) Applicant: GARANT GP, Saint-François (CA)

(72) Inventor: David Boies, Lévis (CA)

(73) Assignee: GARANT GP, Saint-François (CA)

( * ) Notice: Subject to any disclaimer, the term of this patent is extended or adjusted under 35 U.S.C. 154(b) by 81 days.

(21) Appl. No.: 15/671,498

(22) Filed: Aug. 8, 2017

(65) Prior Publication Data

US 2019/0045697 A1 Feb. 14, 2019

(51) Int. Cl.
*A01B 1/22* (2006.01)
*B25G 1/04* (2006.01)
*B25G 1/10* (2006.01)
*B25G 3/26* (2006.01)
*A01B 1/02* (2006.01)

(52) U.S. Cl.
CPC ............ *A01B 1/22* (2013.01); *B25G 1/04* (2013.01); *B25G 1/10* (2013.01); *B25G 3/26* (2013.01); *A01B 1/02* (2013.01)

(58) Field of Classification Search
CPC .. A01B 1/22; A01B 1/02; A01B 1/026; B25G 1/10; B25G 3/26; B25G 1/04; B25G 1/00; B25G 3/00
USPC ............... 294/57; 76/113; 15/143.1–144.4
See application file for complete search history.

(56) References Cited

U.S. PATENT DOCUMENTS

| | | | | |
|---|---|---|---|---|
| 324,379 A * | 8/1885 | Hirst et a. | ............. | E21B 17/043 279/100 |
| 1,263,131 A * | 4/1918 | Seelye | ............. | B25G 3/02 15/143.1 |
| 1,374,336 A * | 4/1921 | Surbaugh | ............. | B25G 3/02 16/109 |
| 3,008,166 A * | 11/1961 | Lay | ............. | B25G 3/00 15/145 |
| 3,380,097 A | 4/1968 | Pharris | | |
| 3,578,825 A | 5/1971 | Merrow et al. | | |
| RE32,364 E | 2/1987 | Carmien | | |
| 4,790,586 A * | 12/1988 | Stoner, Jr. | ............. | A01B 1/22 294/57 |

(Continued)

FOREIGN PATENT DOCUMENTS

CA 124584 11/2009
CA 2653915 C 3/2015

(Continued)

OTHER PUBLICATIONS

International Search Report issued in PCT/CA2018/050686, dated Aug. 13, 2018.

(Continued)

*Primary Examiner* — Gabriela M Puig
(74) *Attorney, Agent, or Firm* — Gwendoline Bruneau

(57) ABSTRACT

An assembly, comprising a handle, a tool head and a sleeve, wherein an end of the handle engages within the sleeve on a first end of the sleeve and the sleeve engages within a socket of the hand tool on a second end of the sleeve, the sleeve thereby securely connecting the handle and the tool hand, and a method of fabrication thereof, comprising providing a handle, providing a sleeve, providing an implement head comprising a socket, inserting the handle, from an end thereof, within the sleeve by a first end of the sleeve, and inserting the sleeve, by a second end thereof, within the socket of the implement head.

14 Claims, 11 Drawing Sheets

(56) References Cited

U.S. PATENT DOCUMENTS

| | | | |
|---|---|---|---|
| 5,213,014 A * | 5/1993 | Carmien | B25G 3/12 294/57 |
| 5,415,448 A * | 5/1995 | Keathley | A01B 1/222 16/422 |
| 5,529,129 A | 6/1996 | Byrd | |
| 5,540,472 A | 7/1996 | Dunlap | |
| 5,664,820 A * | 9/1997 | Carmien | A01B 1/02 294/57 |
| 5,743,577 A | 4/1998 | Newman, Jr. et al. | |
| 6,438,784 B1 | 8/2002 | Yu | |
| 6,948,208 B1 | 9/2005 | Schlenner | |
| 7,121,599 B2 | 10/2006 | Demar et al. | |
| 7,350,839 B2 | 4/2008 | Marquardt et al. | |
| 8,297,670 B2 | 10/2012 | Boies | |
| 2003/0184104 A1 * | 10/2003 | Ping | A01B 1/022 294/57 |
| 2004/0154132 A1 * | 8/2004 | Ritrovato | B25G 1/10 16/430 |
| 2005/0193876 A1 | 9/2005 | Broyles | |
| 2011/0303055 A1 | 12/2011 | Miller et al. | |
| 2017/0021491 A1 | 1/2017 | Mackin et al. | |

FOREIGN PATENT DOCUMENTS

| | | |
|---|---|---|
| CN | 2619761 Y | 6/2004 |
| EP | 0053171 | 12/1981 |
| EP | 0782905 A2 | 7/1997 |
| FR | 1009765 * | 6/1952 |
| FR | 1009765 A | 6/1952 |
| WO | 2016179262 A1 | 11/2016 |

OTHER PUBLICATIONS https://www.homedepot.ca/en/home/p.long-handle-round-point-shovel.1001026370.html; accessed Aug. 3, 2017.

http://www.garant.com/tools/s/garden-construction-tools/shovels/round-point-shovels/long-handle-round-point-shovels/round-point-shovel-engineering-resin; accessed Aug. 3, 2017.

http://www.garant.com/tools/s/garden-construction-tools/shovels/round-point-shovels/long-handle-round-point-shovels/round-point-shovel-long-wood-handle-15; accessed Aug. 3, 2017.

http://www.canadiantire.ca/en/pdp/yardworks-lifetime-series-round-point-long-handle-shovel-0596827p.html#srp; accessed Aug. 2, 2017.

* cited by examiner

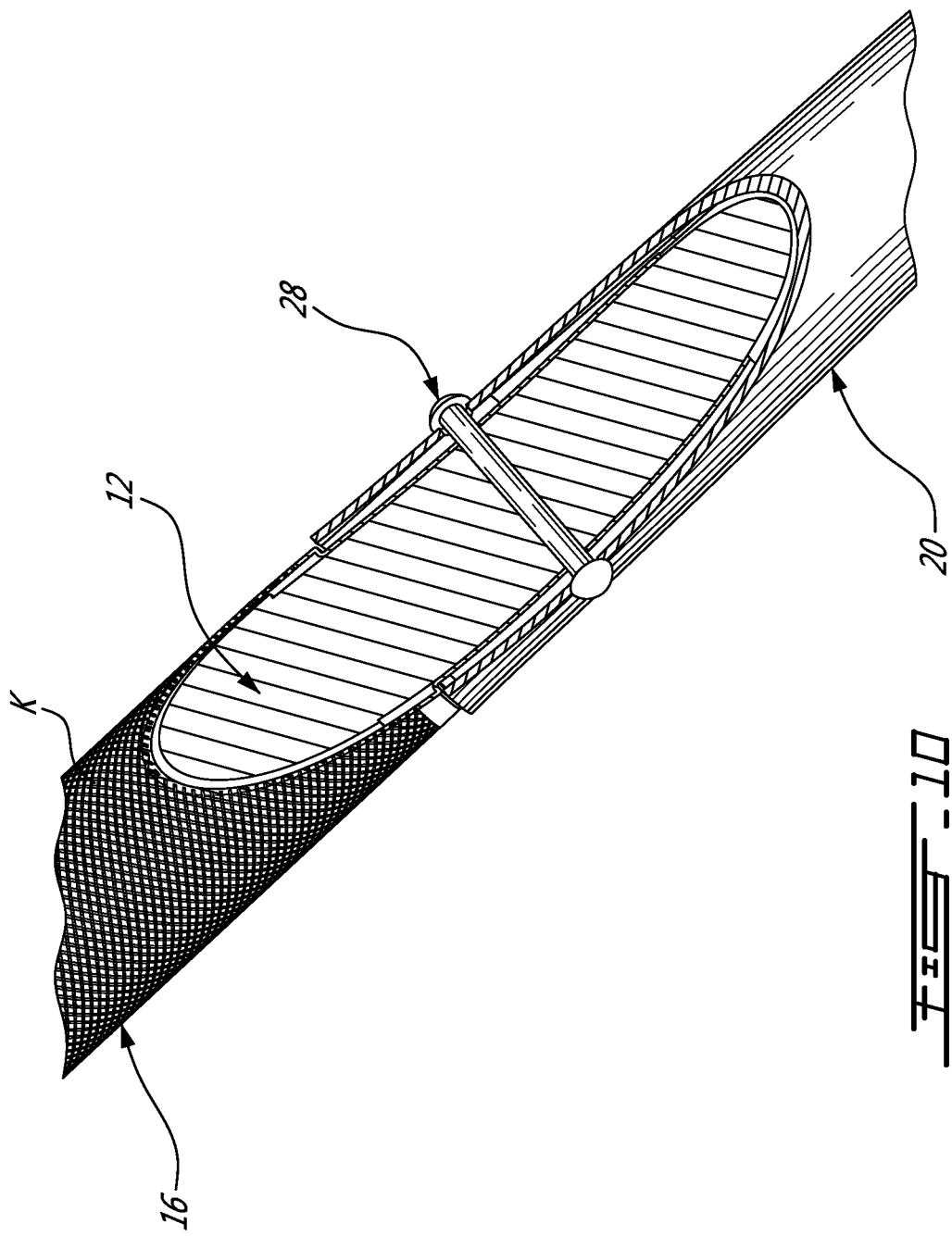

| All products are loaded @ 32" from the step | | |
|---|---|---|
| Tested product | Product Weight (lbs) | Average resistance (lbs) |
| prior art tool 1 | 5,5 | 210,5 |
| | 5,44 | |
| prior art tool 2 | 5,08 | 215 |
| prior art tool 3 | 5,11 | |
| prior art tool 4 | 4,28 | 140 |
| current assembly | 4,69 | 256 |

TOOL HANDLE AND METHOD OF FABRICATION THEREOF

FIELD OF THE INVENTION

The present invention relates to a handle for a tool.

SUMMARY OF THE INVENTION

More specifically, in accordance with the present invention, there is provided an assembly, comprising a handle, a tool head and a sleeve, wherein an end of the handle engages within the sleeve on a first end of the sleeve and the sleeve engages within a socket of the hand tool on a second end of the sleeve, the sleeve thereby securely connecting the handle and the tool hand.

There is further provided a method, comprising providing a handle, providing a sleeve, providing an implement head comprising a socket, inserting the handle, from an end thereof, within the sleeve by a first end of the sleeve, and inserting the sleeve, by a second end thereof, within the socket of the implement head.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 10 is a detail of FIG. 1;

FIG. 11B shows comparative resistance test results obtained with the setup of FIG. 11A.

DESCRIPTION OF EMBODIMENTS OF THE INVENTION

The present invention is illustrated by the following non-limiting examples.

Figure 1:
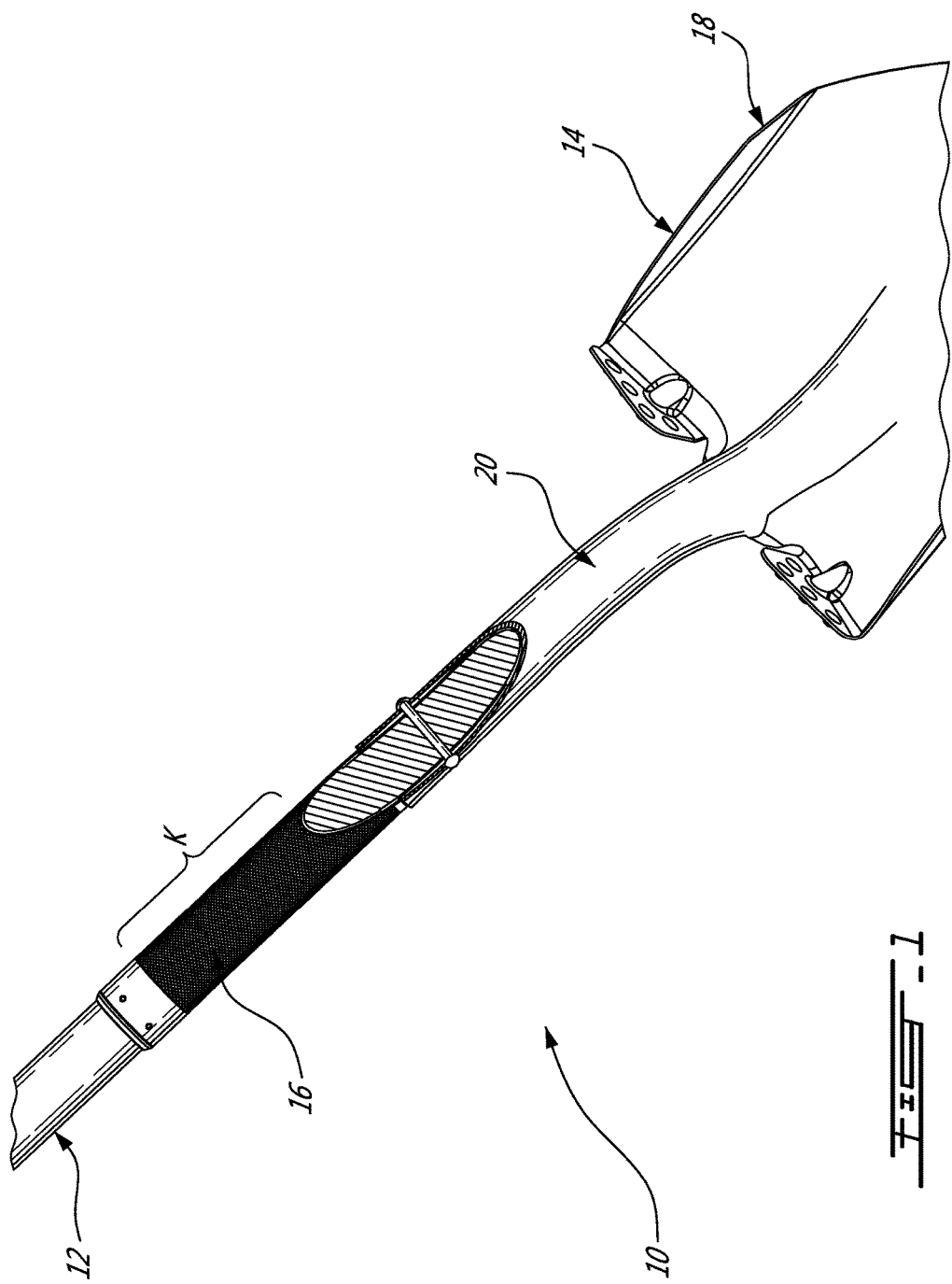
FIG. 1 is a perspective view of a tool according to an embodiment of an aspect of the present invention.

As shown for example in FIG. 1, a tool 10 according to an embodiment of an aspect of the invention comprises a handle 12, a tool head 14 and a sleeve 16 connecting the handle 12 to the tool head 14.

Typically, the tool head 14 comprises a tool body 18, such as the scoop of a shovel as illustrated herein for example, and a socket 20 for connection with the handle 12.

Figure 2:
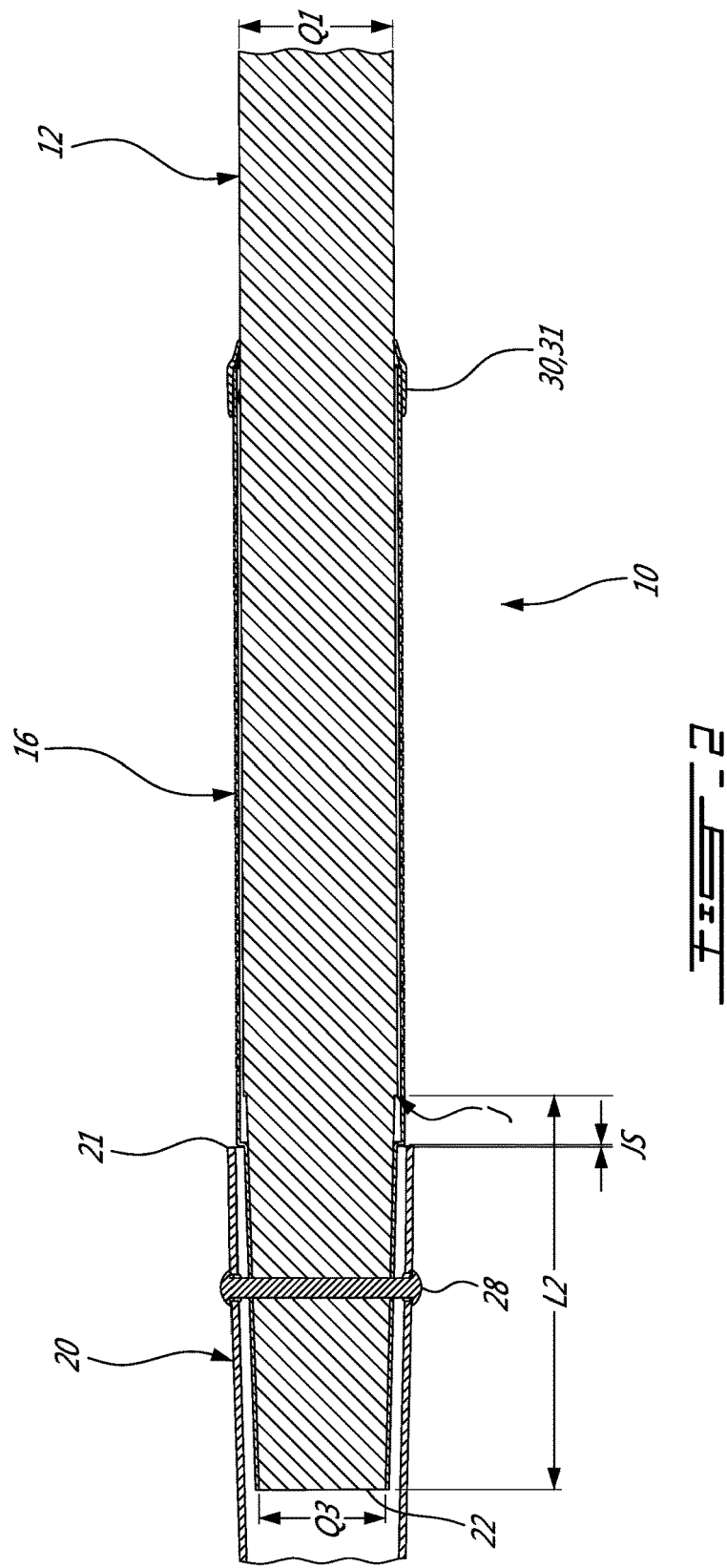
FIG. 2 is a schematical view of an assembly according to an embodiment of an aspect of the present invention.
Figure 3:
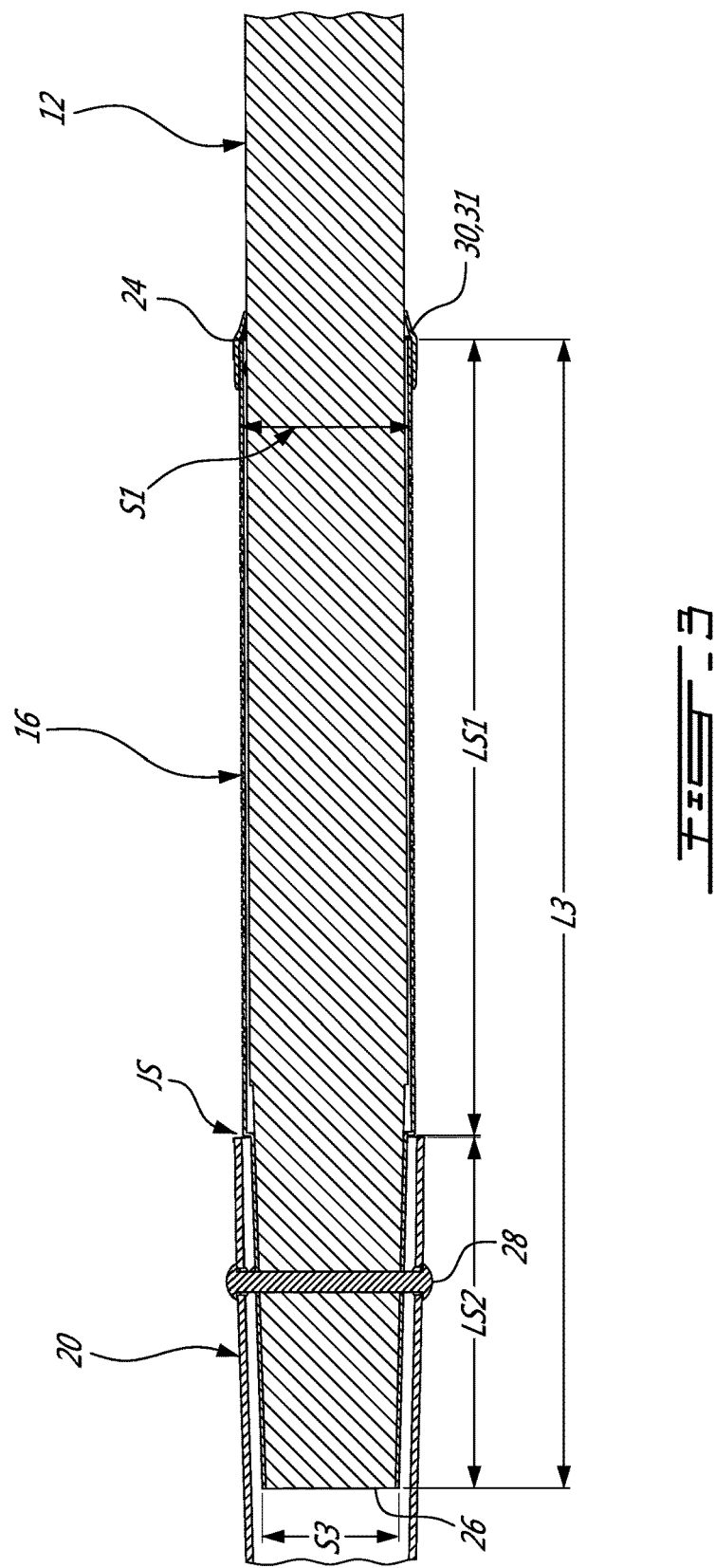
FIG. 3 is a schematical view of an assembly according to an embodiment of an aspect of the present invention.

In FIGS. 1-3, the handle 12 is shown with a cylindrical shape. The handle 12 may be a wood shaft, or it may be made of a composite material, engineering plastic, or metal such as steel or aluminum for example, or of a combination thereof.

The socket 20 may have a tubular shape of a generally constant diameter; or the socket 20 may have a conical shape, i.e. as a tube with a decreasing diameter from an open end 21 thereof to its connection to the too head 14, as illustrated in FIGS. 2 and 3 for example. The socket 20 may be made in a composite material, an engineering plastic, or a metal such as steel or aluminum for example.

Figure 4:
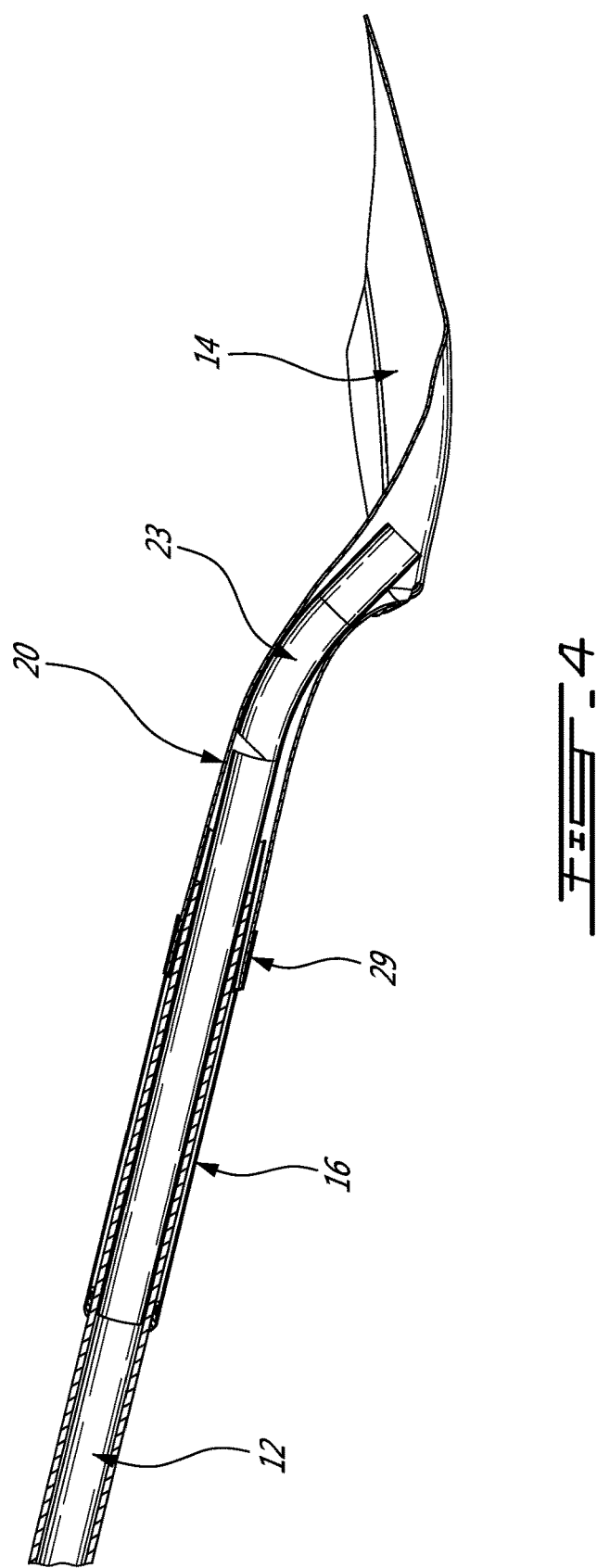
FIG. 4 is a side schematical view of an assembly according to an embodiment of an aspect of the present invention

In case of a hollow handle 12, an insert 23, in a composite material, steel, wood or plastic for example, may be inserted to extend within the handle 12 and the socket 20 for supporting the assembly of the handle 12 with the socket 20 and connecting the handle 12 with the socket 20, from the inside of the handle 12 and of the socket 20 as shown in FIG. 4.

FIG. 2 illustrates an embodiment of a wood handle for example, the handle 12 having a first diameter $\varnothing_1$ up to a shoulder (J), and after the shoulder (J) a slowly decreasing diameter over a length $L_2$ down to a diameter $\varnothing_3$ at a free end 22 thereof (K), with $\varnothing_3 < \varnothing_1$. As best seen in FIG. 3, the sleeve 16 has a first diameter $S_1 > \varnothing_1$ over a length $LS_1$, from a first end thereof 24 up to a shoulder (JS), and after the shoulder (JS) a slowly decreasing diameter over a length $LS_2$, down to a diameter $S_3$, at a second end 26 thereof, with $\varnothing_3 < S_3 < \varnothing_1 < S_1$, for a total length of $L_3 = LS_1 + LS_2$, with $LS_1 \ll LS_2$. The handle 12 can thus be inserted, from its free end 22, inside the sleeve 16, by the first end 24 of the sleeve 16, over a length $LS_1$, i.e. until the shoulder (J) of the handle 12 abuts the shoulder (JS) of the sleeve 16, then the length $L_2$ of decreasing diameter of the handle 12 is within a length $LS_2$ of decreasing diameter of the sleeve 16, while a length of the largest diameter $\varnothing_1$ of the handle 12, corresponding to the length $LS_1$ of the sleeve 16 is covered, on its outer surface, by the sleeve 16, out of the socket 20. The handle 12, with an end region of a length at most LS2 thus covered with the sleeve 16 is inserted within the socket 20.

Figure 5:
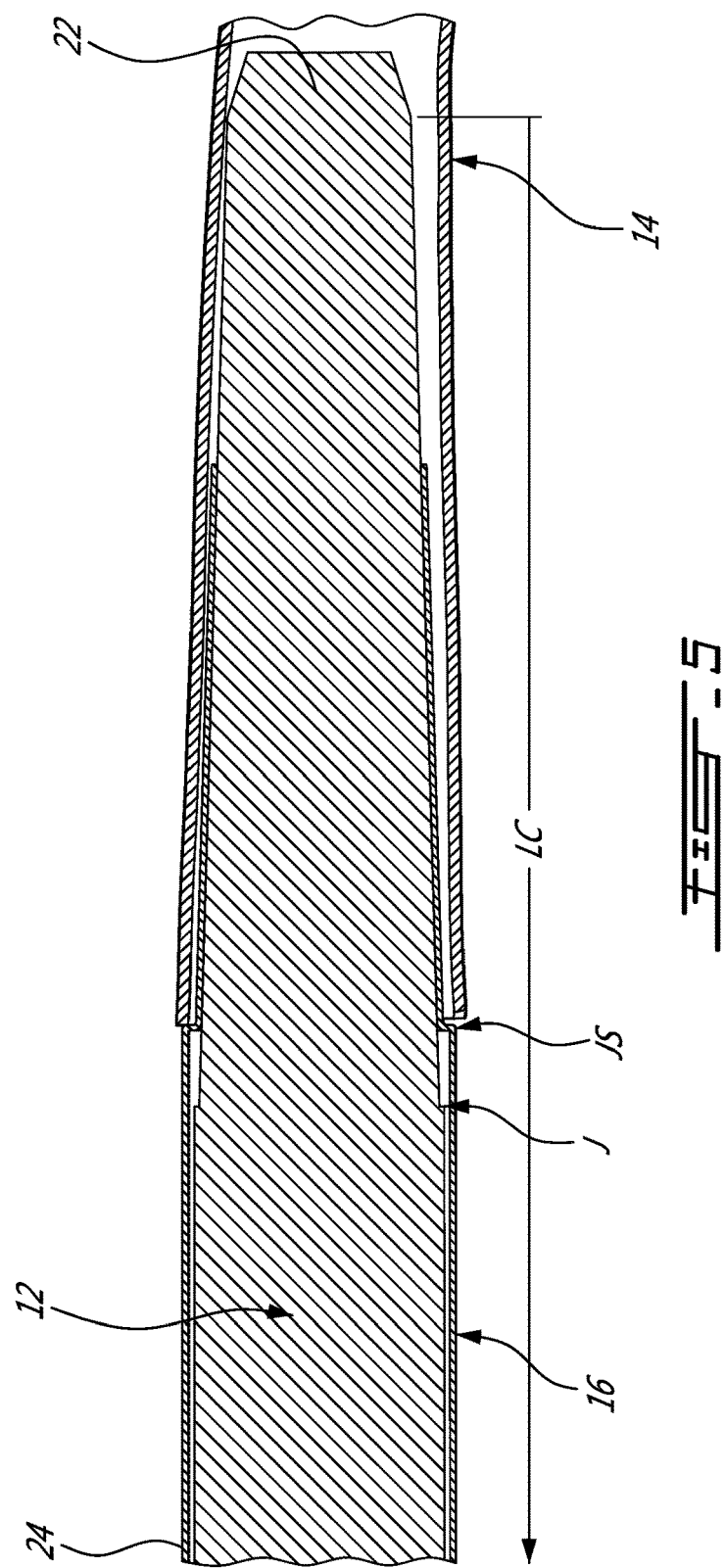
FIG. 5 is a schematical view of an assembly according to an embodiment of an aspect of the present invention.

As shown in an embodiment illustrated in FIG. 5, the shoulder (J) of the handle 12 and the shoulder (JS) of the sleeve 16 are optional.

The handle 12 is thus inserted within the sleeve 16 into a press-fit engagement at least along a distance, i. e. with at least a length thereof covered by the sleeve 16 within the socket 20. In FIG. 5, the handle 12 emerges out of the sleeve 16 within the socket 20 for example, whereas in FIG. 2, the handle end within the socket 20 is flush with the sleeve end within the socket 20. The handle 12 may also end short within the sleeve 16 within the socket 20. The sleeve 16 is inserted within the socket 20 into a press-fit engagement, thereby providing an overlap of the sleeve 16 over the handle 12 over the whole length LS1 on a first end and an overlap of the socket 20 over the sleeve 16 with the handle 12 within the sleeve 16 of a length of at most LS2 on the opposite end of the junction between the handle 12 and the tool head 14, thereby securely connecting the handle 12 and the tool head 14 together.

Figure 6:
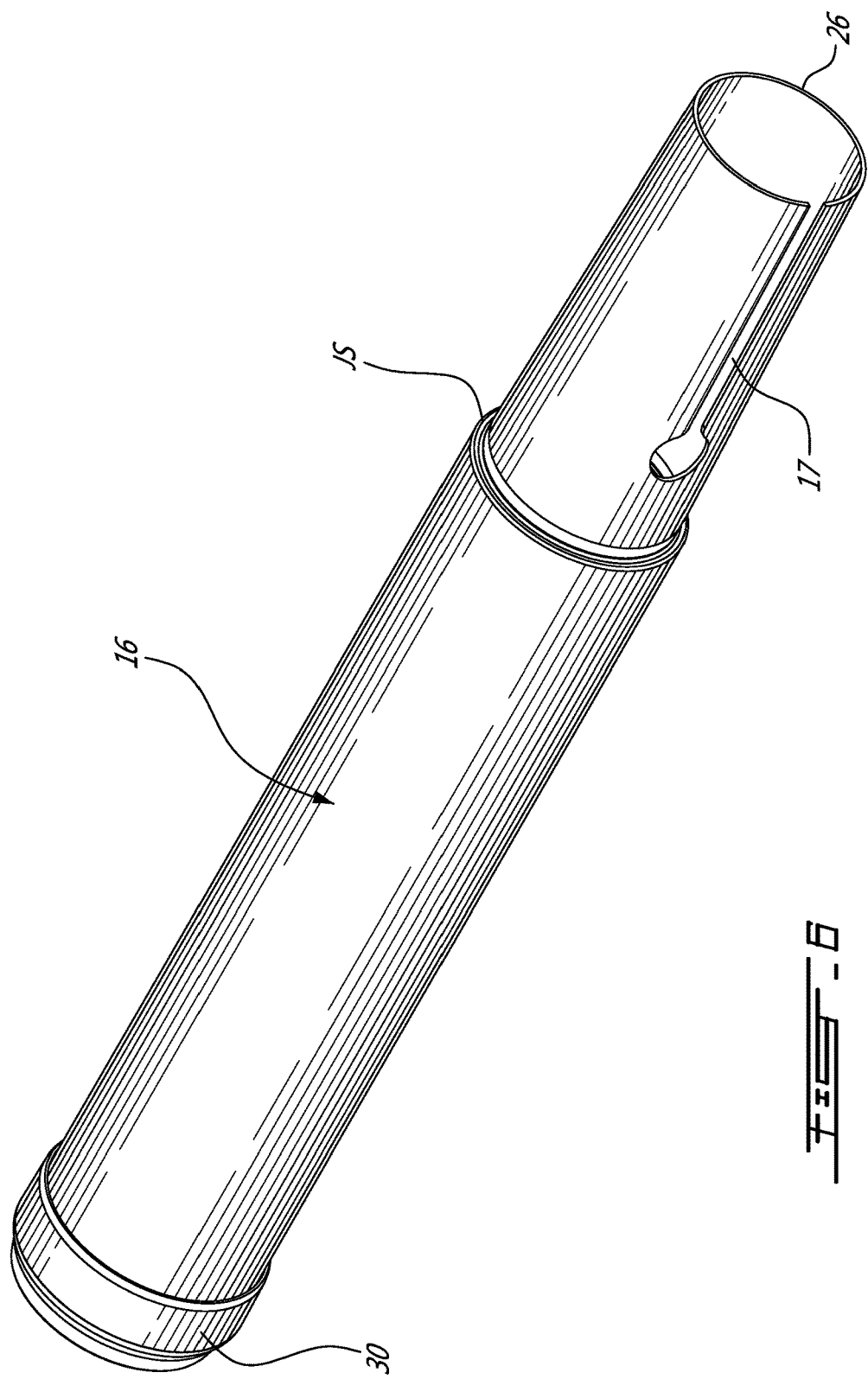
FIG. 6 is a perspective view of a sleeve according to an embodiment of an aspect of the present invention.

Instead of a shoulder (JS), the sleeve 16 may have a length of continuously decreasing diameter followed by a length of constant diameter for example. Still alternatively, the sleeve 16 may have a constant diameter all over a length thereof, a longitudinal slot 17 ending at its end 26, as shown in FIGS. 5 and 6 for example, allowing its insertion within a reduced diameter of the socket 20 by closing of the edges of the slot 17 one against the other.

As shown in FIG. 5 for example, the handle 12 may also be deprived of shoulder (J) and instead have a conical shape over a length $L_c$ thereof, i.e. a length $L_c$ of decreasing diameter, so that the handle 12 is inserted, from its free end 22, inside the sleeve 16, by the first end 24 of the sleeve 16, over the length $L_c$, until its diameter reaches that of the sleeve 16.

Rivets 28 may be used to further secure the assembly together (see FIGS. 2, 5, 10). Alternatively, in case of an insert 23 extending between a hollow handle and the socket as discussed hereinabove in relation to FIG. 4, bending of the insert 23 within the socket 20 is found to create a gripping contact with the inner surface of the socket 230, thereby further securing the assembly together.

As illustrated in FIG. 4 for example, an outer ring 29 may be provided at the junction between the socket 20 and the sleeve 16 for preventing the socket 20 from opening, in case of a slotted socket for example, and further securing the assembly together.

Thus the sleeve 16 may have a constant or a decreasing diameter, it may comprise a shoulder or be deprived thereof, it may comprise a longitudinal slot 17, so as to adjust between the handle and the socket.

Embodiments of the sleeve 16 are shown in FIGS. 6-9.

Figure 7:
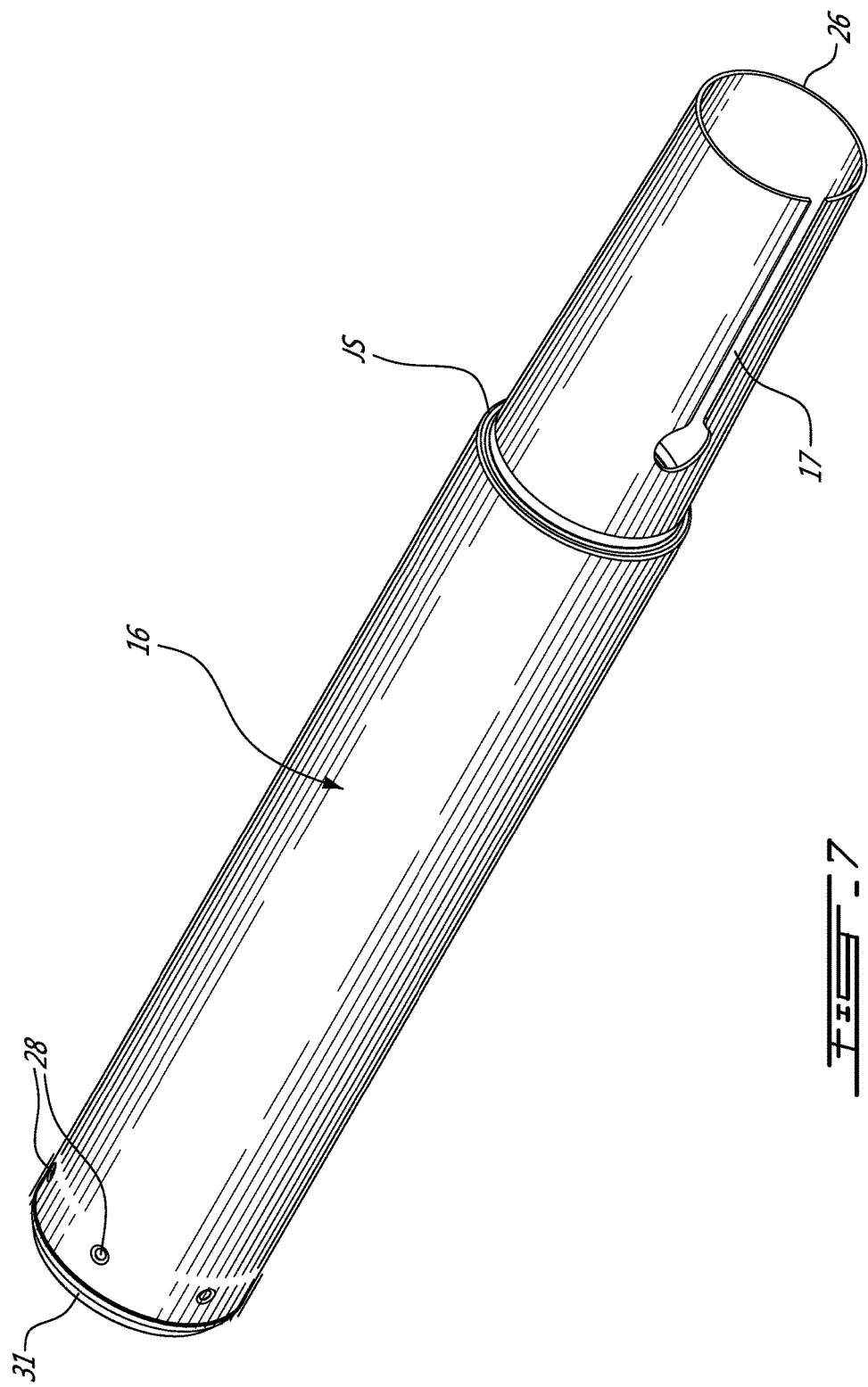
FIG. 7 is a perspective view of a sleeve according to an embodiment of an aspect of the present invention.
Figures 8, 9:
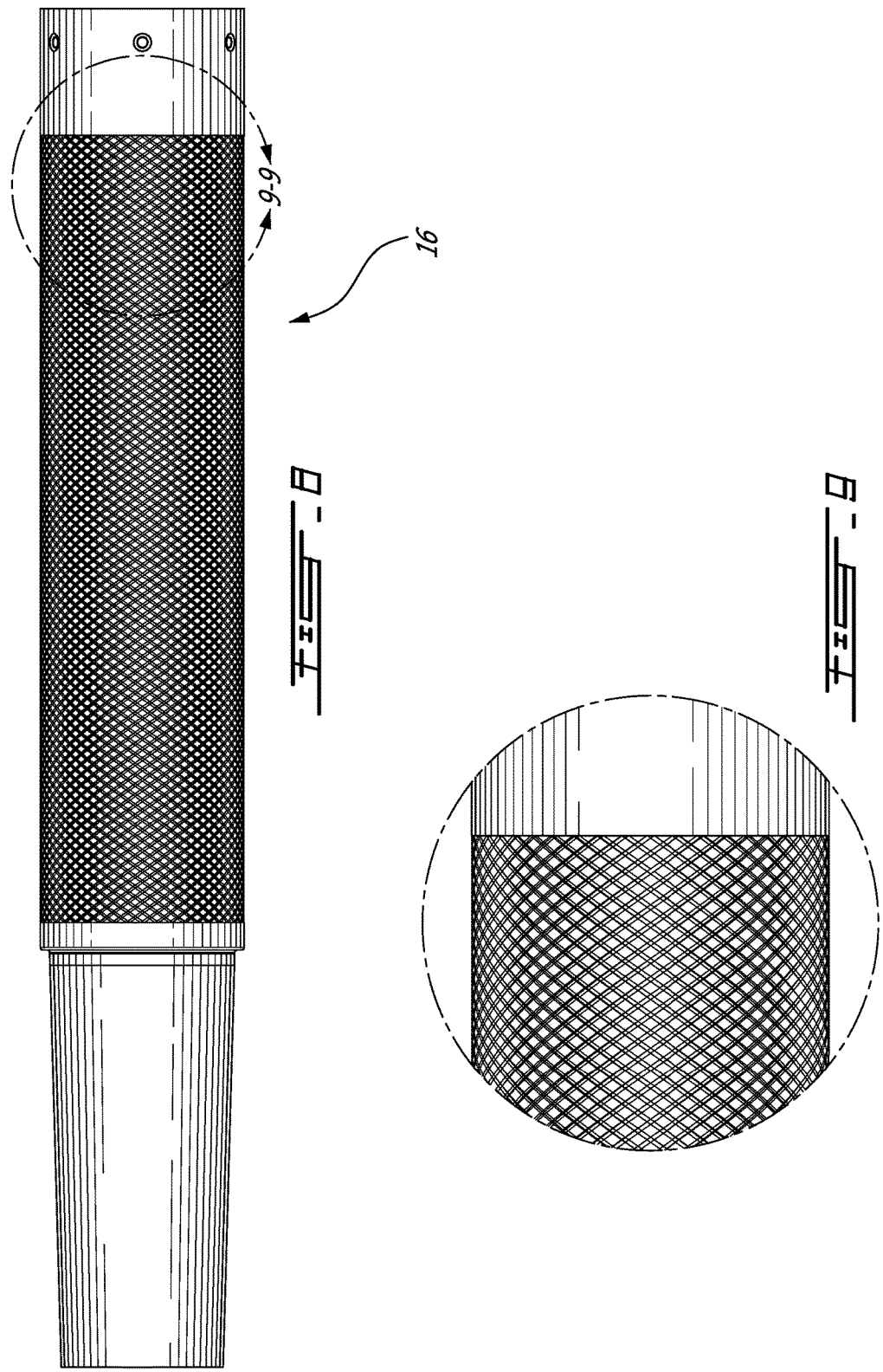
FIG. 8 is a side view of a sleeve according to an embodiment of an aspect of the present invention.
FIG. 9 is a detail of FIG. 8.

As shown in FIGS. 6 and 7, a rubber sleeve ramp 30, 31 may be provided at the junction between the first end 24 of the sleeve 16 and the handle 12 to accommodate variations of the diameter of the handle 12 for example, as well as to cover the edge of the end 24 of the sleeve 16 for example (see FIGS. 2 and 3).

As shown for example in FIGS. 1, 8-10, the outer surface of the sleeve 16 may be provided with knurling (K) thereby providing a gripping area.

The handle 12 may be a hardwood handle or a composite such as in glass fibers for example. The sleeve may be in a metal such as iron, in a plastic or a composite material, or engineering plastic for example.

Depending on the tool head, the tool may be a shovel, a spade, a fork, a shingle remover, a pry bar, a nail puller, a loglifter, a log roller etc. . . .

Figure 11A:
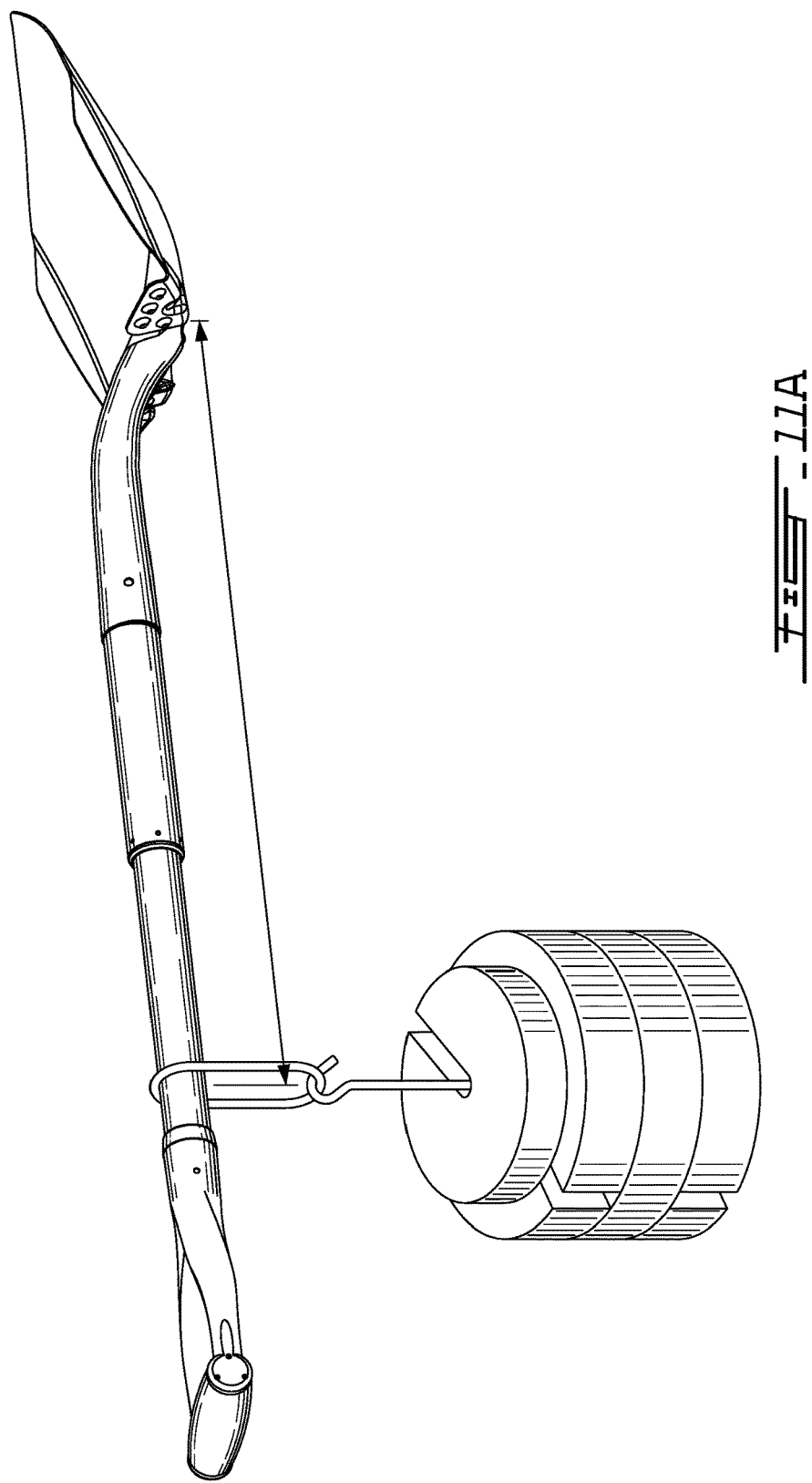
FIG. 11A is a schematical view of a set-up used for testing an assembly according to an embodiment of an aspect of the present invention.

Load tests were performed on different tools comprising a handle connected to a tool head by inserting the free end if the handle within the socket of the tool head and riveting as known in the art, each one characterized by its weight, and with an implement comprising an assembly of a handle and a tool head as described herein, by hanging an increasing load to the handle of the tools maintained generally horizontal by the tool head thereof (see FIG. 11A). Tools of the present invention could withstand larger loads and/or provide enhanced and safer grip and control, due to the sleeve which may be provided with knurling for example, as described hereinabove (see FIG. 11B).

The scope of the claims should not be limited by the embodiments set forth in the examples, but should be given the broadest interpretation consistent with the description as a whole.

The invention claimed is:

1. An assembly, comprising:
   a handle;
   a tool head;
   a socket; and
   a sleeve;
   wherein:
      said sleeve being inserted within said socket over a first length on a first end of a junction between the handle and the tool head and having a second length extending out of said socket, said handle being inserted within said socket over said second length and at least part of said first length, said second length being greater than said first length;
      a combination of: i) said handle abutting only inside said sleeve as said sleeve covers the handle engaged therein over at most said first length within the socket, ii) said sleeve abutting the socket as the socket overlaps the sleeve over said first length, and iii) an overlap of said sleeve over said handle out of said socket being greater than an overlap of said sleeve over said handle within said socket securely connecting said handle and said tool head together.

2. The assembly of claim 1, wherein said handle is a shaft of a constant diameter.

3. The assembly of claim 1, wherein said handle has a varying diameter along at least part of a length thereof.

4. The assembly of claim 1, wherein said sleeve has a varying diameter along at least part of a length thereof.

5. The assembly of claim 1, wherein said handle is in at least one of: wood, composite, engineering plastic and metal.

6. The assembly of claim 1, wherein said sleeve is in at least one of: composite, plastic and metal.

7. The assembly of claim 1, wherein said handle is a hollow handle.

8. The assembly of claim 1, wherein said handle is a hollow handle, said assembly further comprising an insert connecting said handle and the socket of said tool head from the inside of said handle and said socket.

9. The assembly of claim 1, wherein, said sleeve being engaged within said socket, at least a length of said handle within said socket is covered by said sleeve.

10. The assembly of claim 1, wherein, said sleeve being engaged within said socket, a first length of said handle within said socket is covered by said sleeve and a second length of said handle within said socket emerges out of said sleeve.

11. The assembly of claim 1, wherein said sleeve being engaged within said socket, said handle within said socket ends flush with an end of said sleeve within said socket.

12. The assembly of claim 1, wherein said sleeve is engaged within said socket in a press-fit engagement.

13. A method, comprising:
   providing a handle;
   providing an implement head comprising a socket;
   providing a sleeve;
   inserting the sleeve within the socket of the implement head over a first length, the sleeve having a second length extending out of the socket, the second length being greater than the first length;
   inserting the handle within the socket over the second length and at least part of the first length;
   whereby a combination of: i) the handle abutting only inside the sleeve as the sleeve covers the handle engaged therein over at most the first length, ii) the sleeve abutting the socket as the socket overlaps the sleeve over the first length, and iii) an overlap of the sleeve over the handle out of the socket being greater than an overlap of the sleeve over the handle within socket securely connects the handle and the implement head together.

14. The method of claim 13, comprising providing an outer surface of the sleeve with knurling.

* * * * *